United States Patent [19]
Komoto et al.

[11] 3,956,239
[45] May 11, 1976

[54] EPOXY RESIN COMPOSITION INCLUDING AMIDE DERIVATIVE OF 4-AMINOMETHYL-1,8-DIAMINOOCTANE

[75] Inventors: Hiroshi Komoto, Yokohama; Kazuo Toyomoto, Fuji; Kaoru Ohmura, Fuji; Kenji Ito, Fuji; Hideo Sekiguchi, Fuji, all of Japan

[73] Assignee: Asahi Kasei Kogyo Kabushiki Kaisha, Osaka, Japan

[22] Filed: Oct. 25, 1974

[21] Appl. No.: 518,016

[52] U.S. Cl. .............................. 260/47 EN; 260/2 N; 260/59; 260/78 SC; 428/263
[51] Int. Cl.$^2$ ........................................ C08G 30/14
[58] Field of Search ........... 260/47 EN, 2 N, 78 SC, 260/59, 561 R, 561 N

[56] References Cited
UNITED STATES PATENTS

| | | | |
|---|---|---|---|
| 3,028,342 | 4/1962 | Katz | 260/2 N |
| 3,557,056 | 1/1971 | Peerman | 260/47 EN |

*Primary Examiner*—Wilbert J. Briggs, Sr.
*Assistant Examiner*—T. Pertilla
*Attorney, Agent, or Firm*—Sughrue, Rothwell, Mion, Zinn & Macpeak

[57] ABSTRACT

An epoxy resin composition having excellent curability comprising 100 parts by weight of an epoxy resin having at least two epoxy groups per molecule and about 1 to 300 parts by weight of an amide derivative of 4-aminomethyl-1,8-diaminooctane.

15 Claims, No Drawings

3,956,239

EPOXY RESIN COMPOSITION INCLUDING AMIDE DERIVATIVE OF 4-AMINOMETHYL-1,8-DIAMINOOCTANE

BACKGROUND OF THE INVENTION

1. Field of the Invention

The present invention relates to an epoxy resin composition and, more particularly, to an epoxy resin composition comprising an epoxy resin and a curing agent not causing any toxicity problems.

2. Description of the Prior Art

It has been previously found that 4-aminomethyl-1,8-diaminooctane is excellent as a curing agent for an epoxy resin as disclosed in the specification of U.S. Pat. Application Ser. No. 363,674, filed May 24, 1973 but the use of 4-aminomethyl-1,8-diaminooctane has difficulties in that it tends to cause toxicity problems and amine blush.

SUMMARY OF THE INVENTION

As the result of various investigations, it has been further discovered that the aforesaid difficulties are overcome by using the curing agent of this invention and an epoxy resin composition having excellent curability and curing property can be obtained by the employment of the curing agent of this invention.

That is, this invention provides an epoxy resin composition comprising 100 parts by weight of an epoxy resin and about 1 to 300 parts by weight, preferably 10 to 200 parts, of an amide derivative of 4-aminomethyl-1,8-diaminooctane.

DETAILED DESCRIPTION OF THE INVENTION

The higher the proportion of the aforesaid amide derivative is, the higher the flexibility and impact resistance of the cured resin composition becomes and the higher the proportion of the epoxy resin, the higher the heat resistance, chemical resistance and hardness of the cured resin composition becomes.

The resin composition of this invention exhibits excellent curability even at low temperatures (lower than 5°C), in the case that the coated material is wet, and in water, but in the case when cured at low temperatures, a phenol, a tertiary amine, or triphenyl phosphite may be incorporated in the resin composition.

Suitable compounds for forming the amide derivative by the reaction with 4-aminomethyl-1,8-diaminooctane are aliphatic monocarboxylic acids such as acetic acid, propionic acid, isobutyric acid, heptanoic acid, hexanoic acid, octanoic acid, decanoic acid, dodecanoic acid, tetradecanoic acid, dodecanoic acid, tetradecanoic acid, octadecenoic acid, and the derivatives thereof, e.g., structural isomers or those derivatives having a substituent such as a halogen atom, a hydroxyl group, an amino group, etc.; aromatic monocarboxylic acids such as benzoic acid, toluylic acid, anisic acid, etc.; cyclic monocarboxylic acids such as α-cyclopentylcarboxylic acid, α-cyclohexylmethylcarboxylic acid, etc.; aliphatic dicarboxylic acids or tricarboxylic acids such as succinic acid, adipic acid, sebacic acid, dodecamethylene dicarboxylic acid, octadecamethylene dicarboxylic acid, etc.; aromatic dicarboxylic acids or tricarboxylic acids such as phthalic acid, isophthalic acid, diphenic acid, trimellitic acid, etc.; and dimers or trimers of drying oil fatty acids such as 9-undecylenic acid, linderic acid, thujic acid, zoomaric acid, oleic acid, linoleic acid, linolenic acid, arachidonic acid, clupanodonic acid, etc.; the esters and halides of the above-described carboxylic acids such as methyl oleate, methyl benzoate, the ethyl ester of a linolenic acid trimer, octyl chloride, benzoyl chloride, phthaloyl chloride, etc.; and lactams such as ε-caprolactam, α-pyrrolidine, azetidinone, etc.

Preferably the amide derivative of 4-aminomethyl-1,8-diaminooctane has at least two active hydrogens based on the amino group per molecule and the amide derivative prepared by condensing 1 mol of 4-aminomethyl-1,8-diaminooctane with about 0.1 to 2 mols of the above-described monocarboxylic acid or an ester or a halide of the monocarboxylic acid or with about 0.1 to 1 mol of the above-described di- or tricarboxylic acid or an ester or a halide of the di- or tricarboxylic acid is preferably used. Also, the amide derivative prepared by reacting 4-aminomethyl-1,8-diaminooctane with about 0.1 to 10 moles of the above-described lactam is preferably used.

If the proportion of the carboxylic acid or the lactam is lower than as described above, the effect of the amide derivative is poor and if the proportion is higher than as described above, the workability of the resin composition containing the amide derivative is reduced.

In preparing the amide derivative of 4-aminomethyl-1,8-diaminooctane as used in this invention, the reaction of the above-described reactants with the 4-aminomethyl-1,8-diaminooctane can be conducted in the absence of a solvent at a temperature of about 60° to 200°C, preferably 100° to 180°C. The amidation reaction is generally completed in about 1 to 10 hours, more generally 2 to 10 hours. In the latter stages of the amidation, the reaction is conducted at a pressure of about 760 mmHg to 2 mmHg, preferably 50 mmHg to 2 mmHg.

Furthermore, by further reacting the amide derivative of 4-aminomethyl-1,8-diaminooctane and acrylonitrile or a monoepoxide, the toxicity of the amide derivative can be reduced, the compatibility of the amide derivative with an epoxy resin can be increased, and further the workability thereof can be improved.

Examples of suitable monoepoxides which can be used for the above-described improvement are ethylene oxide, propylene oxide, octylene oxide, styrene oxide, butylglycidyl ether, phenylglycidyl ether, glycidyl ester of versatic acid, etc.

In using acrylonitrile or the monoepoxide, preferably about 0.1 to 2 mols of acrylonitrile or the monoepoxide are reacted with 1 mol of 4-aminoethyl-1,8-diaminooctane and the product can be easily obtained by reacting the reactants at room temperature (about 20° to 30°C) or under heating. If the amount of acrylonitrile or the monoepoxide is less than about 0.1 mol, the effect of their addition is low and if the amount is higher than about 2 mol, the properties of the cured resin composition are deteriorated.

In the further reaction of the amide derivative of 4-aminoethyl-1,8-diaminooctane with acrylonitrile or a monoepoxide as described above, the reaction can be conducted in the absence of a solvent and a suitable reaction temperature ranges from about 10° to 80°C, preferably 20° to 60°C, with the reaction generally being completed in about 1 to 8 hours, more generally 2 to 8 hours.

The reaction product described above can be compounded with an epoxy resin so that 1 mol of active hydrogen is present per 1 mol of epoxy group but the compounding ratio can be varied appropriately considering the workability and the properties of the cured resin composition which result. Usually 100 parts by weight of an epoxy resin and about 1 to 300 parts by weight, preferably 10 to 200 parts by weight of the above-described reaction product or amide derivative are preferably compounded. If the proportion of the aforesaid reaction product is less than about 1 part by weight per 100 parts by weight of the epoxy resin, the curing rate is reduced, while if the proportion is higher than about 300 parts by weight, workability is reduced. Furthermore, if the proportion of the reaction product is outside the above-described range, the cured resin composition has inferior properties.

Known epoxy resins can be used in this invention, for example, as described in Kuniyuki Hashimoto, *Epoxy Resin*, Chapter 2, published by Nikkan Kogyo Shinbun Sha (1969). A wide variety of epoxy resins can be used and a suitable epoxy equivalent for the epoxy resins which can be used in this invention ranges from about 50 to 10,000 preferably 70 to 5,000.

The epoxy resin has the feature that it has at least two 1,2-epoxy groups per molecule and the residue of the molecule is composed of a carbon chain or a carbon chain interrupted by an ether bond an ester bond or an amino bond. A preferred epoxy resin can be prepared by catalytically reacting an excessive amount of an epoxide such as an epihalohydrin and an alkylene oxide and a polyhydric alcohol such as ethylene glycol, glycerin, trimethylolpropane, etc.; a polyhydric phenol such as resorcinol, hydroquinone, catechol, phloroglycinol, etc.; a polyphenol such as 2,2-bis-(4-hydroxyphenyl)-propane, 4,4'-dihydroxydiphenylmethane, a novolak resin, etc.; a polycarboxylic acid such as p-hydroxybenzoic acid, terephthalic acid, etc.; or an amine compound such as o-toluidine, etc. These epoxy resins are described in the specification of U.S. Pat. No. 2,592,560.

More particularly, an epoxy resin having the formula

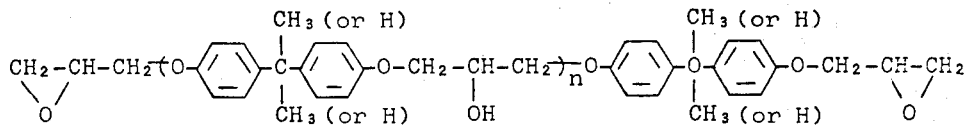 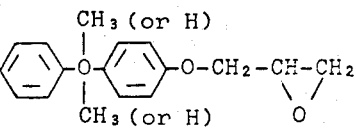

wherein $n$ has a mean value of 0 to 10, preferably 0 to 3 prepared by the reaction of bisphenol A (or F) and epichlorohydrin and a novolak epoxy resin having the formula

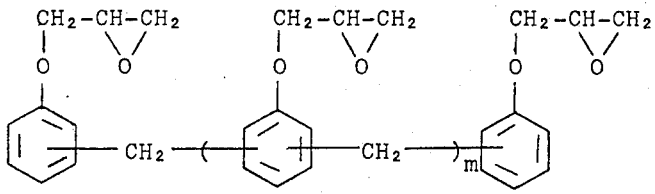

wherein $m$ has a mean value of 0 to about 5 prepared by the reaction of a novolak resin and epichlorohydrin are preferred.

In general, a liquid epoxy resin, i.e., a melting point of lower than about 20°C, is desirable. However, a powder epoxy resin can be sufficiently used using a diluent as described below. Also, an aqueous dispersion of an epoxy resin which can be diluted with water can be used.

Furthermore, conventionally known curing agents such as an aliphatic polyamine (e.g., diethylenetriamine, triethylenetetramine, diethylaminopropylamine, hexamethylenediamine, etc.), an aromatic polyamine (e.g., m-phenylenediamine, diaminodiphenylmethane, diaminodiphenylsulfone, etc.), a compound polyamine (e.g., tris(dimethylaminomethyl)phenol, xylenediamine, etc.), a polycarboxylic acid or an anhydride thereof (e.g., phthalic anhydride, trimellitic anhydride, pyromellitic anhydride, etc.), a polycarboxylic acid hydrazide (e.g., adipic acid hydrazide, etc.), dicyandiamide, a $BF_3$-amine complex compound (e.g., a $BF_3$-monoethylamine complex, etc.), etc., can be also used, if desired, together with the above-described curing agent of this invention. The curing agents can be employed in a proportion of about 1 to 200 weight parts, preferably 2 to 150 weight parts, to 100 weight parts of the epoxy resins.

If the viscosity of the resin composition of this invention is too high, a solvent such as xylene, methyl isobutyl ketone, cellosolve, etc.; a monoepoxy compound such as an olefin oxide, glycidyl methacrylate, allylglycidyl ether, butylglycidyl ether, styrene oxide, phenylglycidyl ether, etc.; a low viscosity epoxy resin; or a compound having reactive groups other than the epoxy group, such as a tertiary amine, triphenylphosphite; ε-caprolactam, and butyrolactone can be added to the resin composition. A suitable viscosity for the resin composition of this invention is not more than about 20,000 cps when the resin composition is coated by spraying, and is not more than about 50,000 cps when the resin composition is coated using a trowel, etc.

The resin composition of this invention can contain an extending agent, a reinforcing agent, a filler, and a pigment. Examples of these additives are coal tar, glass fibers, asbestos fibers, boron fibers, carbon fibers, cellulose, polyethylene powder, polypropylene powder, quartz power, a mineral silicate (e.g., mica), asbestos powder, slate powder, kaolin, aluminum oxide, aluminum hydroxide, chalk powder, calcium sulfate, calcium carbonate, antimony trioxide, bentonite, silica, lithopone, perlite, zeolite, titanium dioxide, carbon black, graphite, an oxide coloring pigment (e.g., iron oxide), a metal powder (e.g., aluminum powder and iron powder), and the like. These above-described additional addenda can be employed in a proportion of about 2 to 900 weight parts, preferably 5 to 500 weight parts, to 100 weight parts of the epoxy resin.

Embodiments of this invention are further explained and clarified by reference to the following examples but the invention is not to be construed as being limited to these examples. In the examples, all parts are by weight unless otherwise indicated.

EXAMPLE 1

A mixture of 57 parts of the reaction product of 2 mols of 4-aminomethyl-1,8-diaminooctane and 1 mol of the dimer of linoleic acid and 100 parts of an epoxy resin DER-331 J (trade name of a bisphenol A type epoxy resin having an epoxy equivalent of 186~192, made by Dow Chemical Co.) was coated in a thickness of 200 microns on a degreased soft steel plate having a thickness of 0.8 mm and the steel plate was allowed to stand at room temperature (20°~25°C).

In addition, a bending test was applied to a sample prepared by coating the above-described mixture in a thickness of about 50 microns on a tin plate having a thickness of 0.3 mm.

The bending test is carried out by placing a rod axially against the uncoated side of the plate and bending the rod from both ends that are parallel to the rod around the rod and behind the rod through an angle of 180° to form a U shape around the rod. The <180 inches φ2mm means that no defect is observed until a rod having a diameter of 2mm is used in the bending test.

The coated surface of the sample became tack free 5.5 hours after coating and the properties of the coating after one week were as follows:

| | |
|---|---|
| Surface Condition | Good |
| Erichsen Test | 8.0 mm |
| Impact Test (du Pont) | ½"/300g/40cm |
| Bending Test | <180" φ2mm |

EXAMPLE 2

The same procedure as in Example 1 was followed using a mixture of 58 parts of the reaction product of 2 mols of 4-aminomethyl-1,8-diaminooctane and 1 mol of the addition product of linolic acid and olefic acid and 100 parts of epoxy resin DER-331 J. The coated layer became tack free after 5 hours and the properties of the coating after one week were as follows:

| | |
|---|---|
| Surface Condition | Good |
| Erichsen Test | 7.5 mm |
| Impact Test (du Pont) | ½"/300g/35cm |
| Bending Test | <180" φ2 mm |

EXAMPLE 3

The same procedure as in Example 1 was followed using a mixture of 57 parts of the reaction product of 3 mols of 4-aminomethyl-1,8-diaminooctane and 1 mol of the trimer of linolenic acid and 100 parts of epoxy resin DER-331 J. The coated layer became tack free after 5 hours and the properties of the coating after one week were as follows:

| | |
|---|---|
| Surface Condition | Good |
| Erichsen Test | 8.5 mm |
| Impact Test (du Pont) | ½"/300g/40cm |
| Bending Test | <180" φ2 mm |

EXAMPLE 4

The same procedure as in Example 1 was followed using a mixture of 11 parts of the reaction product of 2 mols of 4-aminomethyl-1,8-diaminooctane and 1 mol of adipic acid, 100 parts of epoxy resin DER-661 J (trade name of a bisphenol A type epoxy resin having an epoxy equivalent of 475~575, made by Dow Chemical Co.), and 50 parts of a 1:1:1 by volume mixture of xylene, methyl isobutyl ketone, and cellosolve. The coated layer became tack free after 7 hours and the properties of the coating after one week were as follows:

| | |
|---|---|
| Surface Condition | Good |
| Erichsen Test | 7.0 mm |
| Impact Test (du Pont) | ½"/300g/30cm |
| Bending Test | <180" φ2 mm |

EXAMPLE 5

The same procedure as in Example 1 was followed using a mixture of 64 parts of the reaction product of 1 mol of 4-aminomethyl-1,8-diaminooctane and 1.5 mols of octanoic acid and 100 parts of epoxy resin DER-331 J. The coated layer became tack free after 5.5 hours and the properties of the coating after one week were as follows:

| | |
|---|---|
| Surface Condition | Good |
| Erichsen Test | 7.5 mm |
| Impact Test (du Pont) | ½"/300g/30cm |
| Bending Test | <180" φ2 mm |

EXAMPLE 6

The same procedure as in Example 1 was followed using a mixture of 47 parts of the reaction product of 1 mol of 4-aminomethyl-1,8-diaminooctane and 1 mol of 4-dodecenoic acid and 100 parts of epoxy resin DER-331 J. The coated layer became tack free after 4.5 hours and the properties of the coating after one week were as follows:

| | |
|---|---|
| Surface Condition | Good |
| Erichsen Test | 7.0 mm |
| Impact Test (du Pont) | ½"/300g/35cm |
| Bending Test | <180" φ2 mm |

EXAMPLE 7

The same procedure as in Example 1 was followed using a mixture of 150 parts of the reaction product of 1.2 mols of 4-aminomethyl-1,8-diaminooctane and 1 mol of linolenic acid, 100 parts of epoxy resin DEN-431 (trade name of an epoxy-novolak type resin having an epoxy equivalent of 172~179, made by Dow Chemical Co.), and 20 parts of a 1:1:1 by volume mixture of xylene, methyl isobutyl ketone and cellosolve. The coated layer became tack free after 7 hours and the properties of the coating after one week were as follows:

| | |
|---|---|
| Surface Condition | Good |
| Impact Test (du Pont) | ½"/300g/30cm |
| Erichsen Test | 8.0 mm |
| Bending Test | <180" φ2 mm |

EXAMPLE 8

The same procedure as in Example 1 was followed at 5°C using a mixture of 57 parts of the reaction product of 2 mols of 4-aminomethyl-1,8-diaminooctane and 1 mol of the dimer of linolenic acid, 100 parts of epoxy resin DER-331 J, and 10 parts of phenol. The coated layer became tack free after one day and the properties of the coating after one week were as follows:

| | |
|---|---|
| Surface Condition | Good |
| Erichsen Test | 8.0 mm |
| Impact Test (du Pont) | ½"/300g/35cm |
| Bending Test | <180" φ2 mm |

EXAMPLE 9

A mixture of 57 parts of the reaction product of 2 mols of 4-aminomethyl-1,8-diaminooctane and 1 mol of the dimer of linolenic acid and 100 parts of epoxy resin DER-331 J was coated on a greased steel plate in water at 20°C and then the sample was immersed in water. The coated layer became tack free after 7 hours and the properties of the coating after one week were as follows:

| | |
|---|---|
| Surface Condition | Good |
| Erichsen Test | 7.0 mm |
| Impact Test (du Pont) | ½"/300g/30cm |
| Bending Test | <180" φ2 mm |

EXAMPLE 10

The same procedure as in Example 1 was followed using a mixture of 35 parts of the reaction product of 1 mol of 4-aminomethyl-1,8-diaminooctane and 2 mols of ε-caprolactam and 100 parts of epoxy resin DER-331 J. The coated layer became tack free after 5 hours and the properties of the coating after one week were as follows:

| | |
|---|---|
| Surface Condition | Good |
| Erichsen Test | 8.0 mm |
| Impact Test (du Pont) | ½"/300g/40cm |
| Bending Test | <180" φ2 mm |

EXAMPLE 11

The same procedure as in Example 1 was followed using a mixture of the product prepared by reacting 1.5 mols of acrylonitrile and the reaction product of 1 mol of 4-aminomethyl-1,8-diaminooctane and 0.2 mol of the dimer of linolenic acid and 100 parts of epoxy resin DER-330 J (trade name of a bisphenol A type epoxy resin having an epoxy equivalent of 180~190, made by Dow Chemical Co.). The coated layer became tack free after 4 hours and the properties of the coating after one week were as follows:

| | |
|---|---|
| Surface Condition | Good |
| Erichsen Test | 8.0 mm |
| Impact Test (du Pont) | ½"/500g/35cm |
| Bending Test | <180" φ2 mm |

EXAMPLE 12

The same procedure as in Example 1 was followed using a mixture of 69.2 parts of the product prepared by reacting 0.5 mol of propylene oxide and the reaction product of 1 mol of 4-aminomethyl-1,8-diaminooctane and 0.5 mol of the dimer of linolenic acid and 100 parts of epoxy resin DER-330 J. The coated layer became tack free after 4.5 hours and the properties of the coating after one week were as follows:

| | |
|---|---|
| Surface Condition | Good |
| Erichsen Test | 8.5 mm |
| Impact Test (du Pont) | ½"/500g/40cm |
| Bending Test | <180" φ2 mm |

EXAMPLE 13

A mixture of 27.0 parts of epoxy resin, Epikote 828 (trade name of a bisphenol A type epoxy resin having an epoxy equivalent of 184~194, made by Shell Chemical Co.), 11.5 parts of epoxy resin DER-732 (trade name of a polyglycol type epoxy resin having an epoxy equivalent of 305~335, made by Dow Chemical Co.), 31.2 parts of titanium dioxide, 0.14 part of an emulsifying agent, Noigen EA-137 (trade name of a polyoxyethylene alkyl phenol type emulsifying agent, made by Dai-ichi Kogyo Seiyaku K.K.), 0.14 part of an emulsifying agent, Epan 785 (trade name of a polyoxyethylene-polyoxypropylene condensation type emulsifying agent, made by Dai-ichi Kogyo Seiyaku K.K.), 0.14 part of an emulsifying agent, Noigen EA-50 (trade name of a polyoxyethylene nonylphenol ether type emulsifying agent made by Dai-ichi Kogyo Seiyaku K.K. ), and 0.5 part of a defoaming agent, Silicone KM-73 (trade name of a silicone defoaming agent, made by Shinetsu Chemical Industries Co.) was blended using a kneader and then titanium dioxide was completely dispersed therein using a rolling mill to provide a paste.

Then, 70.89 parts of the paste thus prepared was heated to 50°C and after adding thereto 29.11 parts of water heated to 50°C, the mixture was sufficiently stirred using a homogenizer or a high speed mixer until an emulsion type epoxy resin containing titanium dioxide was formed.

Then, the same procedure as in Example 1 was followed using a mixture of 100 parts of the oil-in-water type epoxy resin dispersion thus prepared and 18.8 parts of the reaction product of 1 mol of 4-aminomethyl-1,8-diaminooctane and 0.5 mol of the dimer of linolenic acid. The compatibility of the components at mixing was better and further the mixture showed good film-forming properties. The coated layer became tack free after 7 hours and the properties of the coating after 1 week were as follows:

| | |
|---|---|
| Surface Condition | Good |
| Erichsen Test | 7.5 mm |
| Impact Test (du Pont) | ½"/500g/30cm |
| Bending Test | <180" φ2 mm |

EXAMPLE 14

A mixture of 48 parts of the reaction product of 2 mols of 4-aminomethyl-1,8-diaminooctane and 1 mol of the dimer of linolenic acid and 100 parts of epoxy resin DER-331 J was coated on an aluminum sheet, cured for one day at room temperature, heated for 3 hours at 80°C, and then the tensile shearing peel strength and the T-friction peel strength of the coating were measured according to the methods of ASTM D 1002-64 and ASTM D 1876-61T.

The results were as follows:

| | |
|---|---|
| Tensile Shearing Peel Strength | 79kg/cm² |
| T-Friction Peel Strength | 2.2kg/in |

COMPARISON EXAMPLE 1 (to EXAMPLE 1)

The same procedure as in Example 1 was followed using a mixture of 50 parts of the reaction product of 2 mols of diethylenetriamine and 1 mol of the dimer of linolenic acid and 100 parts of epoxy resin DER-331 J. The coated layer became tack free after 8 hours and the properties of the coating after one week were as follows:

| | |
|---|---|
| Surface Condition | Not Good |
| Erichsen Test | 7.0 mm |
| Impact Test (du Pont) | ½"/300g/35cm |
| Bending Test | <180" φ2 mm |

COMPARISON EXAMPLE 2 (to EXAMPLE 14)

The same tests as in Example 14 were conducted using a mixture of 40 parts of 2 mols of triethylenetetramine and 1 mol of linolenic acid and 100 parts of epoxy resin DER-331 J. The results obtained were as follows:

| | |
|---|---|
| Tensile Shearing Peel Strength | 58kg/cm² |
| T-Friction Peel Strength | 0.6kg/in |

While the invention has been described in detail and with reference to specific embodiments thereof, it will be apparent to one skilled in the art that various changes and modifications can be made therein without departing from the spirit and scope thereof.

What is claimed is:

1. An epoxy resin composition comprising 100 parts by weight of an epoxy resin having at least 2 1,2-epoxy groups per molecule, the residue of said molecule being composed of a carbon chain or a carbon chain interrupted by an ether bond, and ester bond or an amino bond, and about 1 to 300 parts by weight of an amide derivative of 4-aminomethyl-1,8-diaminooctane.

2. A epoxy resin composition comprising 100 parts by weight of an epoxy resin having at least 2 1,2-epoxy groups per molecule, the residue of said molecule being composed of a carbon chain or a carbon chain interrupted by an ether bond, an ester bond or an amino bond, and about 1 to 300 parts by weight of the reaction product of an amide derivative of 4-aminomethyl-1,8-diaminooctane and acrylonitrile or a monoepoxide selected from the group consisting of ethylene oxide, propylene oxide, octylene oxide, styrene oxide, butylglycidyl ether, phenylglycidyl ether and glycidyl ether of versatic acid.

3. The epoxy resin composition as claimed in claim 1, wherein the proportion of said amide derivative is 10 to 200 parts by weight per 100 parts by weight of the epoxy resin.

4. The epoxy resin composition as claimed in claim 2, wherein the proportion of said amide derivative is 10 to 200 parts by weight per 100 parts by weight of the epoxy resin.

5. The epoxy resin composition as claimed in claim 1, wherein the amide derivative comprises the reaction product of 4-aminomethyl-1,8-diaminooctane and at least one of a carboxylic acid, a carboxylic acid ester, a carboxylic acid halide, and a lactam.

6. The epoxy resin composition as claimed in claim 2, wherein the amide derivative comprises the reaction product of 4-aminomethyl-1,8-diaminooctane and at least one of a carboxylic acid, a carboxylic acid ester, a carboxylic acid halide, and a lactam.

7. The epoxy resin composition as claimed in claim 5, wherein said amide derivative comprises the reaction product of 1 mol of 4-aminoethyl-1,8-diaminooctane and about 0.1 to 2 mols of a monocarboxylic acid, a monocarboxylic acid ester or a monocarboxylic acid halide.

8. The epoxy resin composition as claimed in claim 6, wherein said amide derivative comprises the reaction product of 1 mol of 4-aminomethyl-1,8-diaminooctane and about 0.1 to 2 mols of a monocarboxylic acid, a monocarboxylic acid ester or a monocarboxylic acid halide.

9. The epoxy resin composition as claimed in claim 5, wherein said amide derivative comprises the reaction product of 1 mol of 4-aminomethyl-1,8-diaminooctane and about 0.1 to 1 mol of a di- or tricarboxylic acid, a di- or tricarboxylic acid ester, or a di- or tricarboxylic acid halide.

10. The epoxy resin composition as claimed in claim 6, wherein said amide derivative comprises the reaction product of 1 mol of 4-aminoethyl-1,8-diaminooctane and about 0.1 to 1 mol of a di- or a tricarboxylic acid halide.

11. The epoxy resin composition as claimed in claim 5, wherein said amide derivative comprises the reaction product of 1 mol of 4-aminomethyl-1,8-diaminooctane and 0.1 to 10 mols of a lactam.

12. The epoxy resin composition as claimed in claim 6, wehrein said amide derivative comprises the reaction product of 1 mol of 4-aminomethyl-1,8-diaminooctane and 0.1 to 10 mols of a lactam.

13. The epoxy resin composition as claimed in claim 1, wherein said epoxy resin is a compound represented by the formula

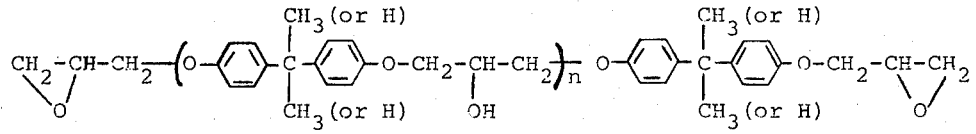

wherein n has a mean value of 0 to 10 or

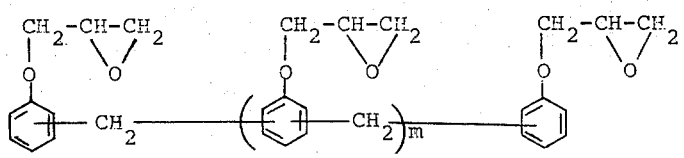

wherein $m$ has a mean value of 0 to about 5.

14. The epoxy resin composition as claimed in claim 2, wherein said epoxy resin is a compound represented by the formula

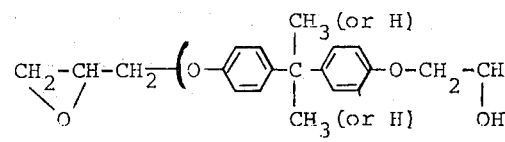

wherein $n$ has a mean value of 0 to 10 or wherein $m$ has a mean value of 0 to about 5.

15. The epoxy resin composition as claimed in claim 2, wherein the proportion of said acrylonitrile or monoepoxide is about 0.1 to 2 mols per mol of 4-aminomethyl-1,8-diaminooctane.

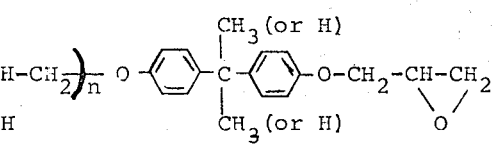

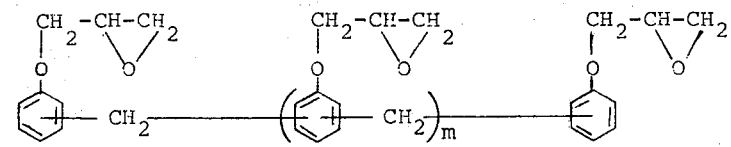

* * * * *

UNITED STATES PATENT OFFICE
CERTIFICATE OF CORRECTION

Patent No. 3,956,239  Dated May 11, 1976

Inventor(s) Hiroshi Komoto, Kazuo Toyomoto, Kaoru Ohmura, Hideo Sekiguchi

It is certified that error appears in the above-identified patent and that said Letters Patent are hereby corrected as shown below:

IN THE SPECIFICATION:

Column 3, line 40, change the following formula:

"
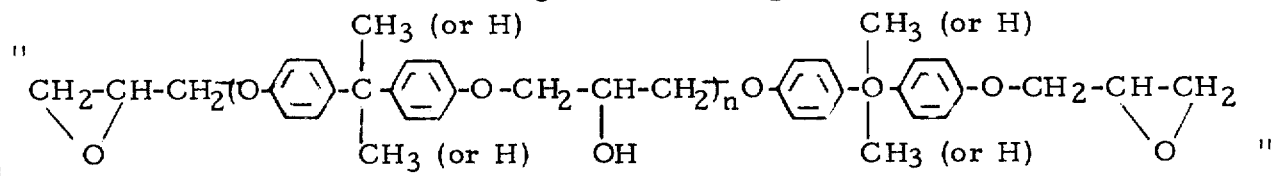
"

to --

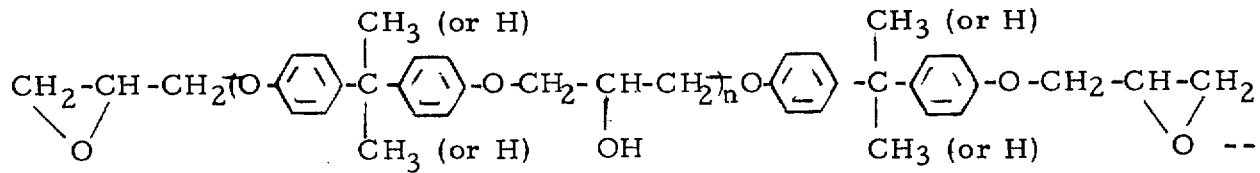
--

Signed and Sealed this

Twenty-fifth Day of October 1977

[SEAL]

Attest:

RUTH C. MASON  
Attesting Officer

LUTRELLE F. PARKER  
Acting Commissioner of Patents and Trademarks